United States Patent
Hoffman et al.

(10) Patent No.: US 6,878,194 B2
(45) Date of Patent: Apr. 12, 2005

(54) REMOTE PURGE DRYING UNIT FOR COMPRESSED GAS

(75) Inventors: Fred Hoffman, Columbia Station, OH (US); Leonard A. Quinn, Lagrange, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 10/359,984

(22) Filed: Feb. 6, 2003

(65) Prior Publication Data

US 2004/0154187 A1 Aug. 12, 2004

(51) Int. Cl.[7] .............................................. B01D 53/02
(52) U.S. Cl. ................. 96/147; 55/385.3; 55/DIG. 17; 285/62; 285/913
(58) Field of Search .......................... 34/443, 666, 418, 34/79, 72, 82, 181, 585; 96/147, 108; 55/385.3, DIG. 17, 421; 285/61, 62, 913, 914

(56) References Cited

U.S. PATENT DOCUMENTS

| | | | |
|---|---|---|---|
| 4,487,617 A | | 12/1984 | Dienes et al. |
| 4,621,839 A | * | 11/1986 | Duell et al. .................... 285/61 |
| 4,782,432 A | * | 11/1988 | Coffman ..................... 362/184 |
| 4,816,047 A | | 3/1989 | Neal |
| 4,955,994 A | | 9/1990 | Knight et al. |
| 5,112,476 A | * | 5/1992 | Cote et al. .................... 210/85 |
| 5,334,230 A | * | 8/1994 | Sloka ......................... 96/113 |
| 5,427,609 A | * | 6/1995 | Zoglman et al. ............... 95/98 |
| 5,522,150 A | | 6/1996 | Schultz |
| 5,607,500 A | * | 3/1997 | Shamine et al. ............. 96/144 |
| 5,622,544 A | | 4/1997 | Shamine et al. |
| 5,792,245 A | | 8/1998 | Unger et al. |
| 5,917,139 A | | 6/1999 | Goodell et al. |
| 6,074,462 A | | 6/2000 | Quinn et al. |
| 6,435,426 B1 | * | 8/2002 | Copp, Jr. .................... 239/346 |

* cited by examiner

*Primary Examiner*—Henry Bennett
*Assistant Examiner*—Camtu Nguyen
(74) *Attorney, Agent, or Firm*—Calfee, Halter & Griswold, LLP

(57) ABSTRACT

An air dryer assembly and mounting bracket for mounting an air dryer to a vehicle. The air dryer assembly has a manifold and a canister which seal against the surface of the mounting bracket. Orientation pegs are provided along the sealing surface of the air dryer manifold and receive corresponding indented regions in a cut out region in the mounting bracket. By providing a number of orientation pegs on the surface of the manifold, a number of mounting orientations for the air dryer assembly can be achieved.

26 Claims, 5 Drawing Sheets

REMOTE PURGE DRYING UNIT FOR COMPRESSED GAS

FIELD OF THE INVENTION

This invention generally relates to an air dryer and more specifically to a method and system for mounting a remote purge air dryer used in an air braking system.

BACKGROUND OF THE INVENTION

In compressed air braking systems, such as those used on commercial vehicles, an air dryer is typically placed in line after the compressor and prior to the rest of the components, such as the compressed air reservoir or air brake units. The air dryer removes harmful contaminants, such as dirt, oil, oil vapor, water and water vapor, from the compressed air, and thus provides clean, dry air to the components of the brake system. Clean dry air increases the reliability and life of the brake system, thereby reducing maintenance costs.

A typical air dryer used in air braking systems contains a desiccant canister, which includes an oil separator and a desiccant material that adsorbs water as the compressed air passes through it. The desiccant material can be regenerated by reversing the air flow and purging the material with dry air supplied from a purge air volume. As the dry air passes through the desiccant material the moisture that was previously adsorbed from the compressed air is transferred back to the air and expelled through an exhaust port.

The purge volume may be either coupled with the brake system reservoir or contained in a separate purge air reservoir. Air dryers with a separate purge air reservoir may be either integrated or remote. An integrated air dryer system, such as the Bendix AD-IS air dryer, has an air dryer with a self contained purge reservoir tank. A remote purge volume air dryer has the purge air reservoir located remotely from the air dryer.

Remote purge volume air dryers are typically preferred over integrated air dryers, since integrated air dryers tend to be larger and more expensive to make. In addition, the size of an integrated air dryer limits the available mounting areas on the vehicle. In addition to the size of the air dryer, other factors contribute to the limited available mounting area. For example, the air dryer must be located far enough away from the compressor so that the temperature at which the air dryer will effectively remove moisture is not exceeded. Furthermore, the air line from the air compressor to the air dryer must slope downward and have as few bends as possible to prevent water from being trapped in the air line and freezing. Thus, it is desirable to have an air dryer that does not use brake system air for its purge cycle and can be easily mounted in a variety of locations.

In addition to the limited mounting location available, current air dryers also have predefined mounting orientations. This is because the air dryers either have mounting holes built into the dryer body, or are provided with standard mounting brackets. As a result, the air dryer can only be mounted in one position. Thus, some air dryers require multiple mounting brackets to be made and stored to facilitate the various mounting positions required by the different types of vehicles.

Furthermore, air dryer canisters have a limited useful life and can only be regenerated a certain number of times before requiring replacement. To facilitate the periodic replacement of the air dryer canister, a convenient mounting location is desirable.

SUMMARY OF THE INVENTION

A method and apparatus for mounting an air dryer assembly to a vehicle in one of several possible mounting orientations is provided.

In one embodiment of the present invention, a air dryer manifold is secured to an air dryer canister with a bracket located therebetween. In this embodiment, orientation pegs located adjacent to the sealing surface of the air dryer manifold and are received by a set corresponding indented regions located in a cut away region of the mounting bracket.

Another aspect of the present invention is a method of mounting an air dryer to a vehicle. In one embodiment of this invention, a mounting bracket having a recess therein is placed over a protrusion on an air dryer manifold. The mounting bracket is rotated to a desired mounting orientation and secured into such orientation by a set of orientation pegs located adjacent to the sealing surface of the air dryer manifold. An air dryer canister is then fastened to the air dryer manifold protrusion, sealing the mounting bracket therebewteen.

BRIEF DESCRIPTION OF THE DRAWINGS

In the accompanying drawings, which are incorporated in and constitute a part of the specification, embodiments of the invention are illustrated, which together with the general description of the invention given above, and the detailed description given below, serve to example the principles of this invention.

DETAILED DESCRIPTION

Figure 1:
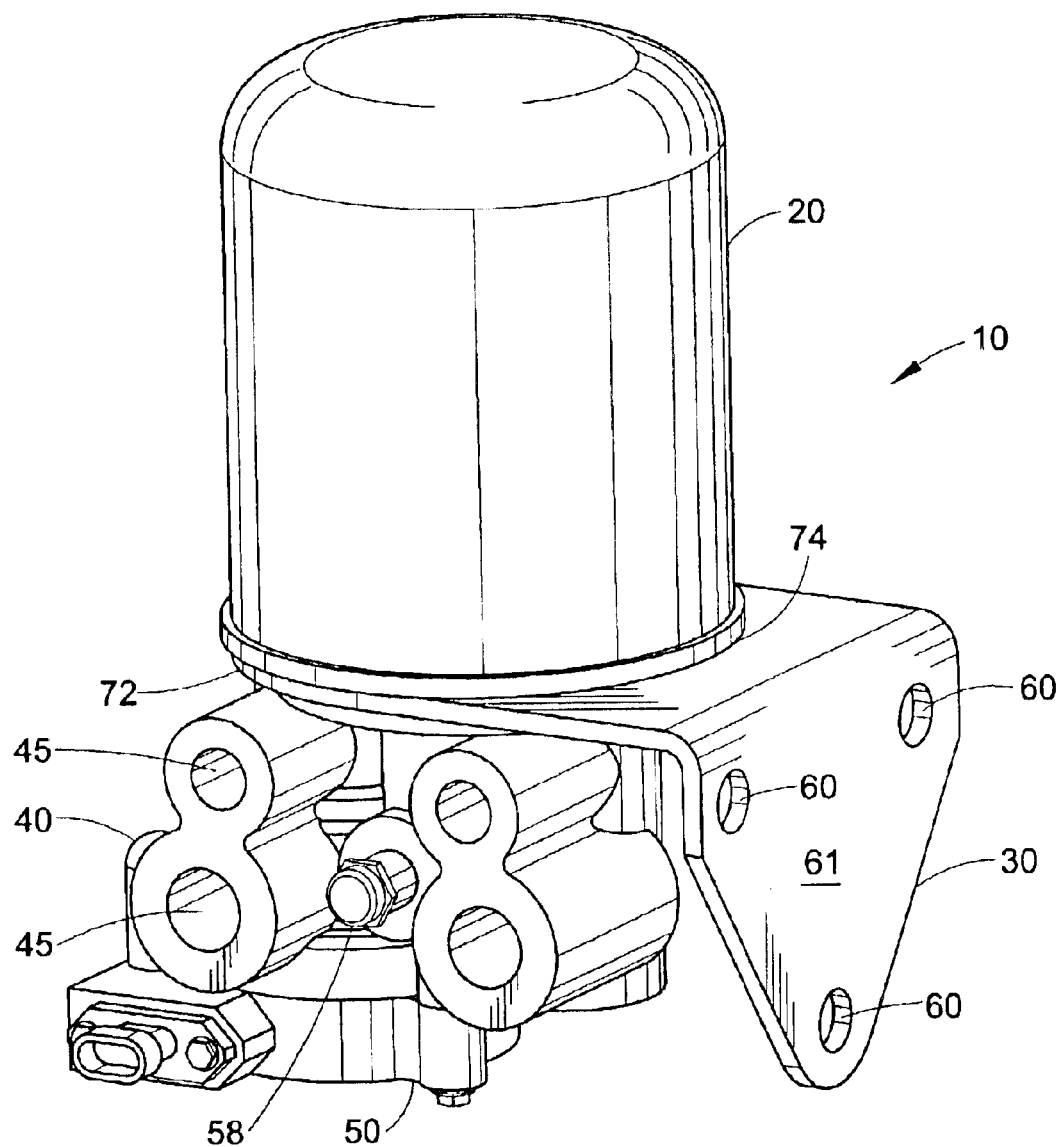
FIG. 1 is a perspective view of an air dryer incorporating a desiccant canister and a mounting bracket.
Figure 2:
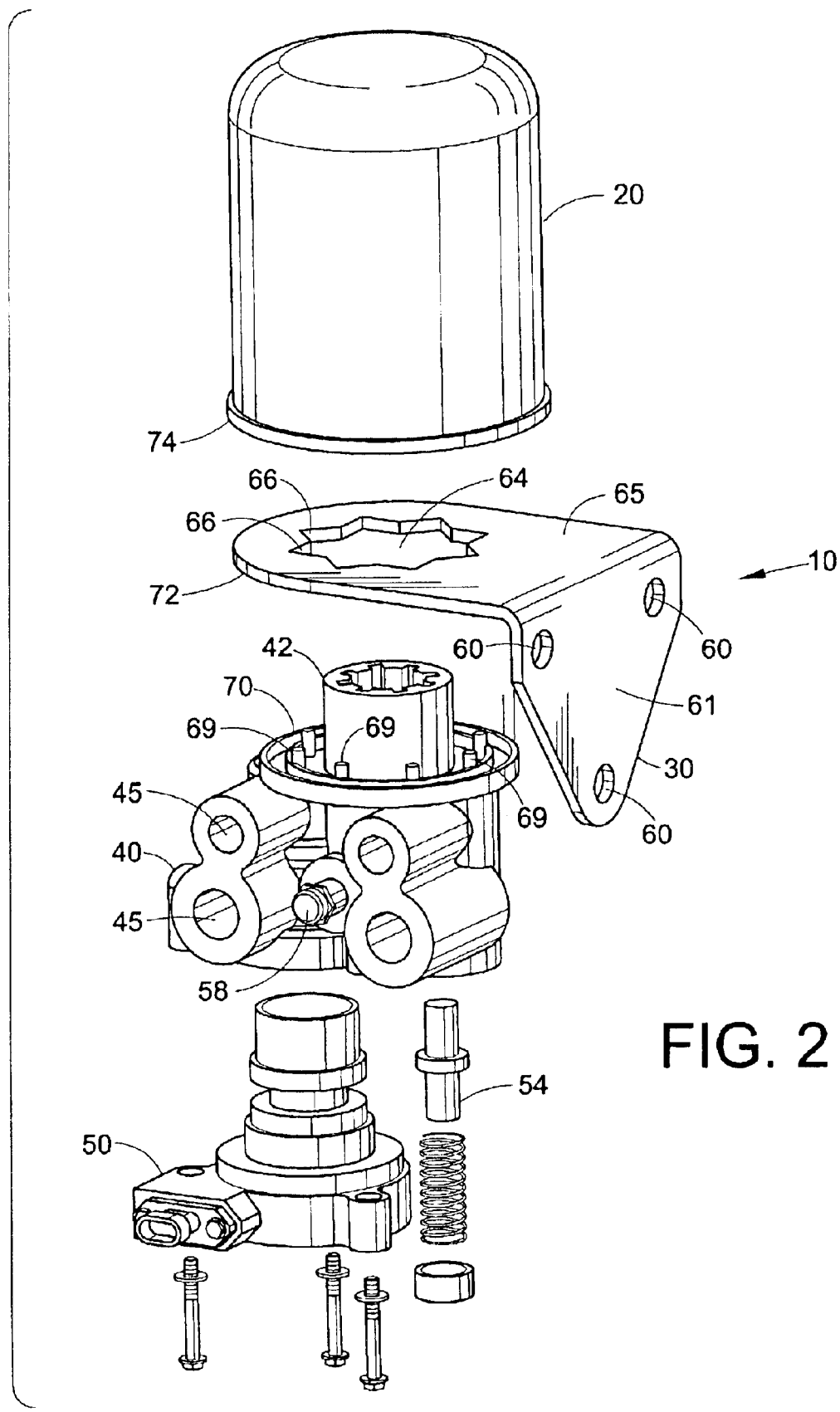
FIG. 2 is an exploded view of an air dryer incorporating a desiccant canister and a mounting bracket.

With reference to FIG. 1, an air dryer assembly, generally referenced as 10, includes an air dyer canister 20, a mounting bracket 30, and an air dryer manifold 40. As best shown in FIG. 2, the air dryer canister 20 is a conventional canister with a set of threads running through an opening on the underside of the cartridge that receives a set of mating threads 42 protruding from the center of the air dryer manifold 40. Preferably, but not necessarily, the threads 42 are between 36 mm and 50 mm. In one embodiment, the threads 42 are 41 mm, while in another embodiment, the threads are 42 mm. Optionally, an adapter can be used to make the canister 20 with 50 mm threads 42 adapt to 39 mm standard threads, for example. The air dryer manifold 40 can have any number of inlet and outlet ports 45, four such ports are shown in FIG. 2. In one embodiment, the air dryer manifold 40 includes a purge valve 50, a check valve 54, a safety release valve 58, or some combination thereof. The air dryer manifold 40 can be made entirely from plastic or it can be made from plastic with metallic inserts. Examples of the plastic that can be used to make the air dryer manifold 40 include Nylon 6, Delrin or accetel.

Figure 3:
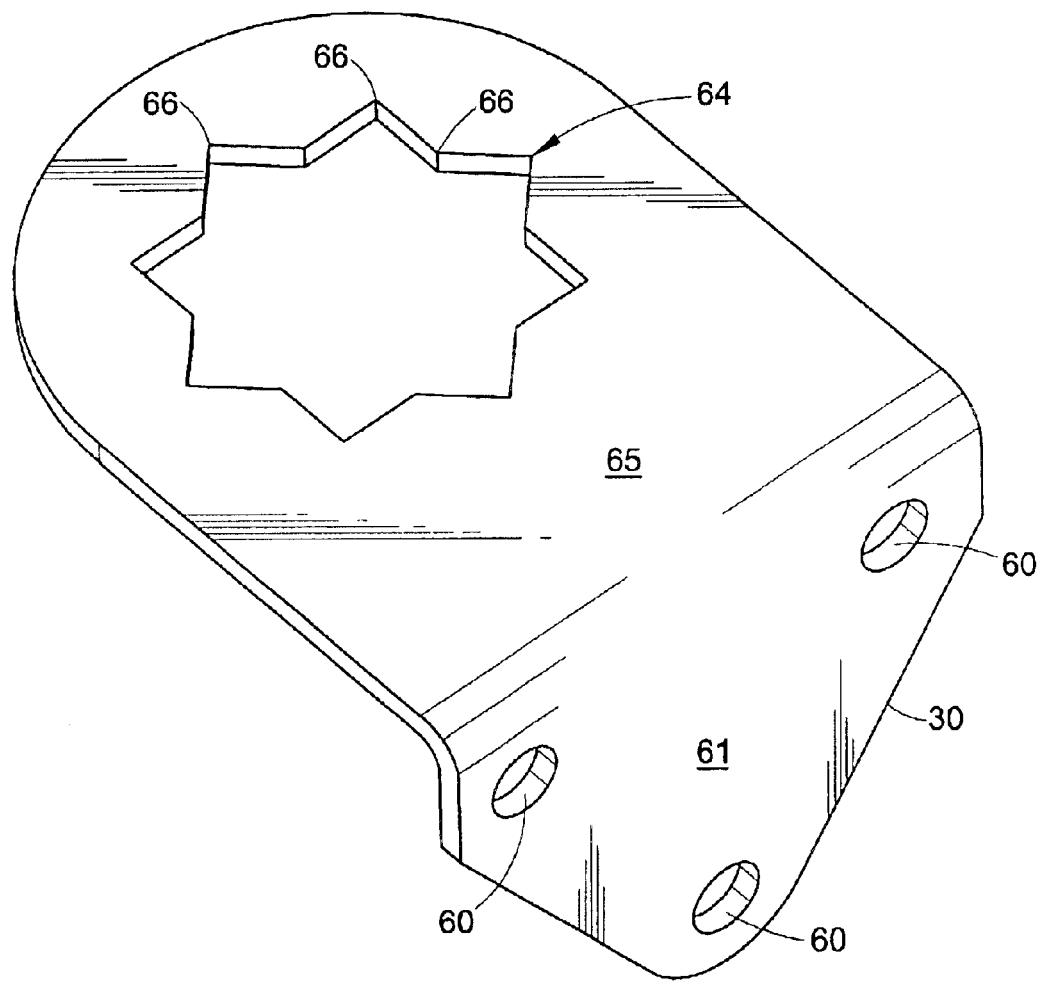
FIG. 3 is a perspective view of a mounting bracket.
Figure 4:
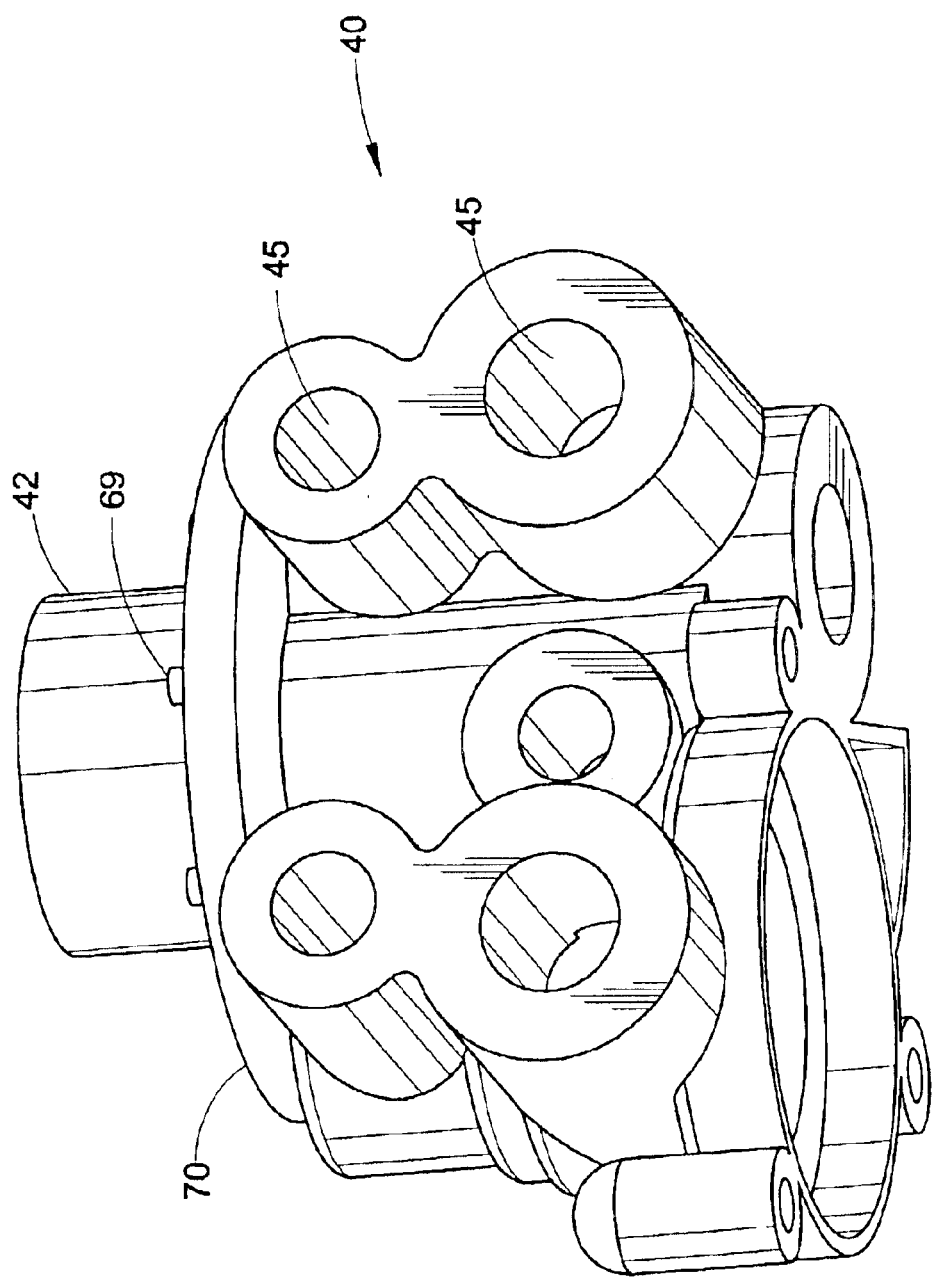
FIG. 4 is a perspective view of an air dryer of the present invention.

Referring now to FIG. 3, the mounting bracket 30, is fastened to a vehicle frame in the desired location. In one embodiment, the mounting bracket 30 is formed from stamped steel and is bolted to the frame through mounting holes 60 located on the side surface 61 of the mounting bracket 30. The mounting bracket 30 has a cut out portion 64 along the top surface 65 that receives the protruding threads 42 from the air dyer manifold 40. In one embodiment, the side surface 61 and the top surface 65 are connected to form an approximate right angle. However, one skilled in the art should appreciate that the angle may be more or less than 90°, depending on the desired mounting orientation of the air dryer assembly 10.

The cut out portion 64 contains a number of indented portions 66 for receiving orientation pegs 69 located adjacent to the sealing surface 70 of the air dyer manifold 40. Each of the orientation pegs 69 are secured against a corresponding indented portion 66, thereby defining and securing the rotative orientation of the mounting bracket 30 relative to the air dryer manifold 40. When the orientation pegs 69 and corresponding indented portions 66 of the mounting bracket 30 are uniformly positioned about the cut out portion 64 of the mounting bracket 30, the air dryer manifold 40 can to be oriented in a plurality of rotative positions with respect to the mounting bracket 30. The ability to rotate the mounting bracket 30 relative to the air dryer manifold 40 permits the inlet and outlet ports 45 to be positioned in a plurality of positions, thereby expanding the possible mounting locations for the air dryer assembly 10. Since the preferred positioning of the air dryer assembly 10 is often dependent upon the vehicle manufacture, it is desirable to allow for a plurality of mounting orientations for the air dryer assembly 10. In the embodiment illustrated in FIGS. 2 and 3, the cut out portion 64 is provided with eight uniformly-spaced indented portions 66, thereby defining an octagonal cut out portion. In this embodiment, the air dryer manifold 40 can be secured to the mounting bracket 30 in eight different orientations, each separated by 45 degrees. In should be appreciated that the number of orientation pegs 69 located on the sealing surface 70 of the air dyer manifold 40, and the number of corresponding indented portions 66, may vary depending on the number of mounting orientations that are desired. Additionally, it should be appreciated that the mounting bracket 30 could have the orientation pegs 69 located on the bottom side 72 that are received in uniformly spaced holes in the sealing surface 70.

Figure 5:
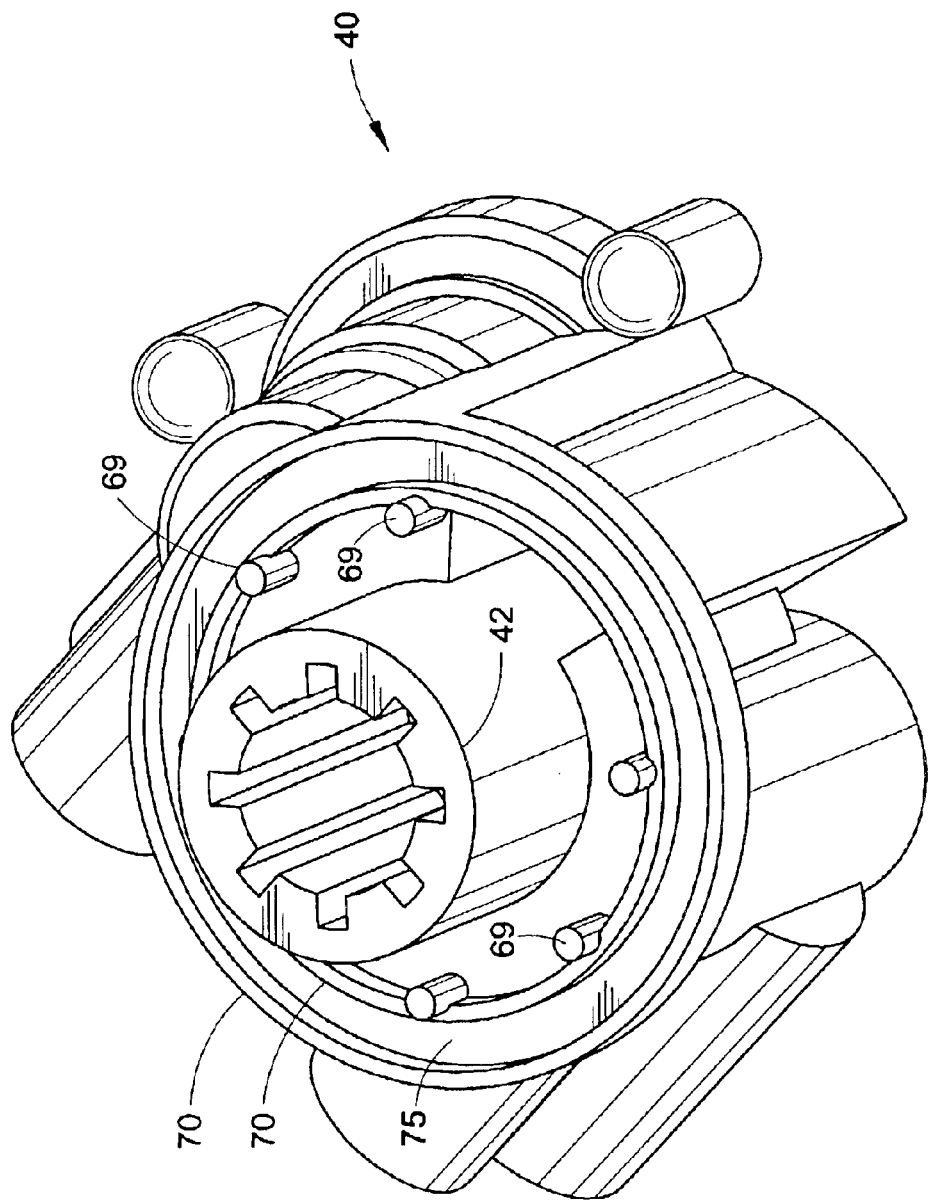
FIG. 5 is a perspective view of an air dryer of the present invention wherein the sealing surface of the air dryer is shown.

Referring now to FIG. 5, the sealing surface 70 of the air dyer manifold 40 is preferably substantially flat with a recess 75 that accepts a seal (not shown) therein. The air dryer canister 20 has a recess to accept a seal along the sealing surface 74. In order to secure the air dryer canister 20 onto the air dryer manifold 40, the cut out portion 64 of the mounting bracket 30 is slipped over the protruding threads 42 of the air dryer manifold 40 such that the orientation pegs 69 located on the manifold sealing surface 70 are fit into the corresponding indented portions 66 of the cut out portion 64 to provide to desired rotative orientation of the air dryer manifold 40 to the valve mounting bracket 30. The air dyer canister 20 is then threaded onto the protruding threads 42 of the air dryer manifold 40. As the air dryer canister 20 is threaded down onto the air dryer manifold 40, the mounting bracket 30 is clamped between the sealing surfaces 70 and 74 of the manifold and canister, respectively. The seals located along the sealing surfaces 70 and 74 compress on the mounting bracket 30 and form an air tight seal.

Since the operation of the air dryer does not depart from the air dryers described in the prior art, a description of such has been omitted.

Use of the mounting bracket 30 and the above-mentioned sealing arrangement allows the air dryer to be mounted without requiring an intermediate bracket typically fabricated by the customer. This feature reduces the cost associated with the air dryer system and provides for easier installation, removal, and orientation of the air dryer.

It will be appreciated that the air dryer assembly may adopt a wide variety of configurations. This invention is intended to include such modifications and alterations in so far as they fall within the scope of the appended claims or the equivalents thereof.

What is claimed is:

1. An air dryer assembly comprising:
   a dryer manifold having a sealing surface and a plurality of orientation pegs located thereon;
   a desiccant canister connectable to said manifold;
   and a mounting bracket having a recess, wherein said recess has a set of indented regions positioned to receive said orientation pegs.

2. The air dryer assembly of claim 1, wherein said plurality of orientation pegs are located adjacent to said sealing surface of said dryer manifold.

3. The air dryer assembly of claim 1, further comprising a first seal disposed between the dryer manifold and one surface of said mounting bracket.

4. The air dryer assembly of claim 3 further comprising a second seal disposed between the canister and a second surface of the mounting bracket.

5. An air dryer assembly comprising:
   a dryer manifold having a sealing surface and a plurality of orientation pegs located thereon;
   a canister connectable to said manifold;
   a mounting bracket having a recess, wherein said recess has a set of indented regions positioned to receive said orientation pegs; and
   a check valve, a purge valve and a safety release valve.

6. The air dryer assembly of claim 1, wherein the number of orientation pegs and corresponding indented regions is eight.

7. The air dryer assembly of claim 1, wherein said orientation pegs are uniformly placed around the sealing surface of the manifold.

8. An air dryer assembly comprising:
   a dryer manifold having a sealing surface and a plurality of orientation pegs located thereon;
   a canister connectable to said manifold;
   a mounting bracket having a recess, wherein said recess has a set of indented regions positioned to receive said orientation pegs; and
   a threaded protrusion located on the dryer manifold that mates with a corresponding threaded region on said canister.

9. The air dryer assembly of claim 8, wherein said recess of said mounting bracket receives the threaded protrusion located on the dryer manifold.

10. The air dryer assembly of claim 1, wherein said mounting bracket comprising a first surface and a second surface connected to said first surface at an angle of approximately 90 degrees.

11. The air dryer assembly of claim 1, wherein said sealing surface is substantially flat.

12. The air dryer assembly of claim 8, further comprising an adapter that is threaded onto said threaded protrusion of said dryer manifold and receives the threaded region of said canister through a set of corresponding threads.

13. The air dryer assembly of claim 8, wherein the threads are between about 36 mm and 50 mm.

14. The air dryer assembly of claim 8, wherein the threads are 42 mm.

15. An air dryer assembly comprising:
   an air dryer manifold having at least one air input port and at least one air outlet port with a desiccant canister threadably secured thereto; and
   a mounting bracket with a means for providing a plurality of mounting orientations of said air dryer manifold relative to said mounting bracket wherein said mounting bracket includes a portion that is received between said air dryer manifold and said canister.

16. An air dryer assembly comprising:
   a dryer manifold;
   a canister connectable to said manifold;
   a mounting bracket for securing said air dryer to a vehicle; and
   a plurality of orientation pegs that engage the mounting bracket at different locations to provide for at least three different orientations of the manifold relative to the mounting bracket.

17. An air dryer assembly comprising:
   an air dryer manifold having at least one air input port and at least one air outlet port and with desiccant canister secured thereto; and
   a mounting bracket for securing said air dryer to a vehicle mountable to said air dryer manifold between said manifold and said canister in a plurality of mounting orientations.

18. An air dryer assembly comprising:
   an air dryer manifold including a threaded region for securing a desiccant canister with a mating set of threads; and
   a mounting bracket,
   wherein said canister includes a sealing surface which contacts said mounting bracket.

19. The air dryer assembly of claim 18, wherein said threaded region includes 42 mm threads.

20. The air dryer assembly of claim 18, wherein said sealing surface includes an o-ring that seals against said mounting bracket.

21. An air dryer assembly comprising:
   a cartridge;
   an air manifold having at least one air input port and at least one air outlet port and including a set of threads; and
   a mounting bracket for securing said air dryer to a vehicle, wherein said mounting bracket is secured by a compressive force formed between said cartridge and said air dryer manifold.

22. The air dryer assembly of claim 21, wherein said cartridge is threadably engaged by said manifold.

23. An air dryer assembly comprising:
   a canister including a sealing surface;
   a an air dryer manifold; and
   a mounting bracket for securing said air dryer to a vehicle, wherein said manifold includes a sealing surface that is smaller in diameter than the sealing surface of the canister.

24. The air dryer assembly of claim 23, wherein the manifold sealing surface is secured against a first side of said mounting bracket and the canister sealing surface is secured against a second side of said mounting bracket.

25. An air dryer assembly comprising:
   a dryer manifold having a sealing surface and a plurality of orientation pegs located thereon;
   a desiccant canister connectable to said manifold; and
   a mounting bracket having a means for receiving said orientation pegs,
   wherein said mounting bracket further comprising a first surface and a second surface connected to said first surface at an angle of approximately 90 degree.

26. The air dryer assembly of claim 25, wherein said manifold sealing surface is secured against a first side of said first surface of said mounting bracket.

\* \* \* \* \*